(12) United States Patent
Holmes et al.

(10) Patent No.: US 7,980,805 B1
(45) Date of Patent: Jul. 19, 2011

(54) EJECTOR BLADE SYSTEM

(76) Inventors: James Holmes, Hudson, IA (US); Peter Prillinger, Aptos, IA (US)

( * ) Notice: Subject to any disclaimer, the term of this patent is extended or adjusted under 35 U.S.C. 154(b) by 744 days.

(21) Appl. No.: 11/943,111

(22) Filed: Nov. 20, 2007

(51) Int. Cl.
*B60P 1/00* (2006.01)
(52) U.S. Cl. .......... 414/517; 414/467; 414/513
(58) Field of Classification Search .......... 414/467, 414/517, 813, 513, 525.2, 525.6, 525.7; 298/1 V; 60/413, 484
See application file for complete search history.

(56) References Cited

U.S. PATENT DOCUMENTS

| | | | | |
|---|---|---|---|---|
| 2,072,998 A | * | 3/1937 | Allin | 298/17.6 |
| 3,106,064 A | * | 10/1963 | McLeod | 60/484 |
| 3,343,876 A | * | 9/1967 | Rapp | 298/1 V |
| 3,438,677 A | * | 4/1969 | Redpath | 298/1 V |
| 3,641,764 A | * | 2/1972 | Destefan et al. | 60/484 |
| 3,774,696 A | * | 11/1973 | Horsch | 172/812 |
| 3,815,764 A | * | 6/1974 | Gilfillan et al. | 414/513 |
| 3,896,947 A | * | 7/1975 | Pearce | 414/517 |
| 3,942,323 A | * | 3/1976 | Maillet | 60/413 |
| 4,046,270 A | * | 9/1977 | Baron et al. | 414/694 |
| 4,071,153 A | * | 1/1978 | Booher | 414/513 |
| 4,175,906 A | | 11/1979 | Johnston et al. | |
| 4,632,628 A | * | 12/1986 | Kress et al. | 414/513 |
| 5,050,380 A | * | 9/1991 | Jonsson | 60/413 |
| 5,479,777 A | * | 1/1996 | Mickel et al. | 60/327 |
| 5,706,657 A | * | 1/1998 | Amborski et al. | 60/413 |
| 6,059,513 A | * | 5/2000 | Goby | 414/517 |
| 6,102,644 A | | 8/2000 | Young et al. | |
| 6,155,776 A | | 12/2000 | Moyna | |
| 6,209,964 B1 | | 4/2001 | Pinto et al. | |
| 6,561,747 B2 | | 5/2003 | Kenny et al. | |
| 6,672,822 B1 | | 1/2004 | Moyna | |
| 6,719,349 B2 | | 4/2004 | Moyna | |
| 6,769,859 B2 | | 8/2004 | Moyna | |
| 2007/0186548 A1 | * | 8/2007 | Smith et al. | 60/413 |

* cited by examiner

*Primary Examiner* — Saúl J Rodríguez
*Assistant Examiner* — Glenn Myers
(74) *Attorney, Agent, or Firm* — Ryan N. Carter

(57) ABSTRACT

An ejector blade adapted to be combined with an ejector truck or trailer body. In one embodiment, the blade comprises fluidly actuated vibrators for loosening material that has become adhered to the ejector blade. In another embodiment, the blade is heated to help prevent material from being frozen to the blade. In yet another embodiment, the blade comprises a plurality of low friction guides to aid the blade in moving through the receptacle body.

4 Claims, 6 Drawing Sheets

EJECTOR BLADE SYSTEM

BACKGROUND OF THE INVENTION

Work machines are used in earth moving operations to move material, such as dirt, rock, clay, ash, and various other materials that can become sticky when they are wet making them difficult to move with conventional dump trucks. Two types of work machines that are commonly used in the industry to perform this task are dump trucks and ejector trucks. Both types of trucks have a receptacle body to carry the material being moved. A dump truck typically raises its receptacle body to dump the load which can result in loss of stability whereas the receptacle body of an ejector truck does not raise up as the load is ejected, thereby minimizing the loss of its stability. In an ejector truck, an ejector blade is moveably mounted within the receptacle body and is coupled to a hydraulic ram or cylinder or other mechanical means which extends and retracts to move the blade through the body. Ejector trucks are useful in many applications where a traditional tilting dump truck is undesirable or impractical. For instance, if there are power lines or a low bridge or other structure located above the worksite, the ejector truck can dump its load without contacting the overhead obstruction as would a tilting dump truck. Also, an ejector truck can better maintain stability while dumping and spread material while moving, thereby reducing the spreading cost and reducing the truck cycle time making it more cost efficient. The ejector truck can also dump and spread the material more accurately than can a gravity-powered tilting dump truck, since the powered ejector blade gives the operator a great deal of control over the flow rate and distribution of the material.

A principal advantage of ejector blade machines is that the ejector blade cleans all the sticky materials out of the receptacle body. In contrast, some of the material in the receptacle body of regular dump trucks can get stuck or frozen to the sides and floor of the receptacle body. In the industry this is known as "carry back" since the material that is stuck in the receptacle body is carried in the receptacle body even after the load has been dumped. Carry back builds up thereby making conventional dump trucks inefficient since they loose load capacity which adds to the cost of operations.

Although ejector blade machines do a good job of preventing carry back inside the receptacle body, material can still get stuck and continue to build up on the ejector blade itself, thereby creating a carry back situation. This type of carry back situation can be amplified if material becomes frozen to the ejector blade during cold weather operations. There have been various attempts to solve the ejector blade carry back problem. One such prior art solution is to coat the ejector blade with a high density plastic to try to prevent material from sticking to the ejector blade. However, this solution has not been successful due to crevices in the blade and scratches in the plastic from abrasive materials that enable material adhesion due to the high amount of pressure against the ejector blade as it ejects a load.

One reason that material becomes adhered to an ejector blade is because of the large amount of pressure that the material being ejected puts on the blade as the blade pushes against and ejects the material from the receptacle body. As the blade pushes against the material, the ejector blade tends to want to twist laterally and pitch fore and aft about the longitudinal axis of the receptacle body. These tendencies are caused by the large amount of material within the body that is resisting the movement of the ejector blade as the material is being ejected. It would be desirable to minimize the twisting of the blade as it ejects material.

One solution that has been attempted to prevent carry back in regular dump trucks is described in U.S. Pat. No. 4,175,906 (Johnston). The device disclosed in the Johnston patent comprises a hydraulically powered vibrator mounted to the underside of the receptacle body. The vibrator is actuated when the receptacle body is raised above a predetermined angle. The vibrator is powered by the hydraulic system that raises and lowers the receptacle body. Although this design may work for traditional dump trucks, it does not work with trucks that have ejector blades because of the longitudinal movement of the ejector blade through the receptacle body. It would be impractical and prone to failure to have hydraulic hoses or electric cables dangling or moving through the receptacle body as the ejector blade is extending and retracting through the length of the receptacle body.

SUMMARY OF THE INVENTION

One aspect of the present invention relates to a device and method for combining a fluidly driven vibrator with an ejector blade of an ejector truck. When actuated, the vibrator vibrates thereby loosening material that has become adhered to the ejector blade. The ejector truck comprises a fluidly driven extension cylinder for extending and retracting the ejector blade. In one embodiment, fluid from the extension cylinder is used to power the vibrator. The fluid is directed from the extension cylinder through the vibrator motor to actuate the vibrator. After the fluid passes through the vibrator it is directed to a fluid accumulator. The accumulator has a volume that allows fluid to accumulate therein until the pressure inside the accumulator reaches a predetermined maximum amount. When the pressure reaches the predetermined maximum amount it no longer accepts additional fluid. When the ejector blade is retracted and fluid from the cylinder is returned to tank, the pressure that has built up within the accumulator forces the fluid out of the accumulator and through the vibrator in the reverse direction through the extension cylinder, thereby actuating the vibrator again, until pressure within the accumulator stabilizes to the preset level and volume. This use of an accumulator allows the vibrator to be actuated during both extension and retraction of the ejector blade without the need for a separate fluid return hose.

In another aspect of the invention, some or all of the ejector blade and/or receptacle body is heated so as to loosen any frozen material that may have become adhered thereto. This heat may come from any suitable source, such as an auxiliary heater. In one embodiment, the hot exhaust gases from the machine's engine are directed into channels formed inside the ejector blade and/or into channels formed inside the floor or walls of the receptacle body to heat the blade and/or receptacle body. After passing through channels inside the blade and/or receptacle body the gasses are expelled through an exit opening into the ambient atmosphere.

In another aspect of the invention, the ejector blade comprises a plurality of low friction guides to help guide the blade through the receptacle body and prevent the ejector blade from twisting laterally and pitching fore and aft about the longitudinal axis of the receptacle body. These guides may be rollers, self lubricating guide blocks, or any other suitable guide.

DETAILED DESCRIPTION OF THE INVENTION

Figure 1:
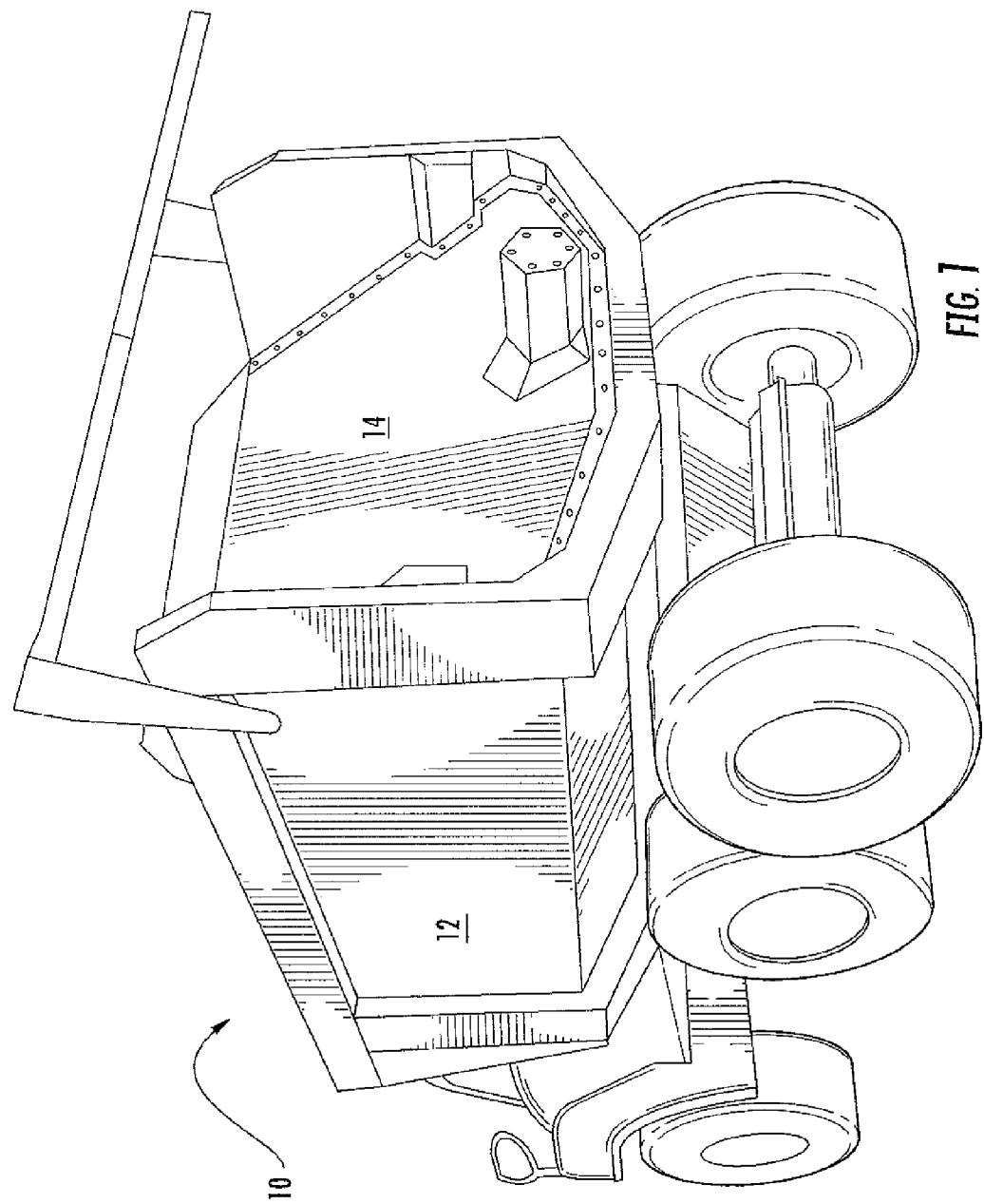
FIG. 1 is a rear perspective view of an ejector truck showing the ejector blade in its extended position.
Figure 2:
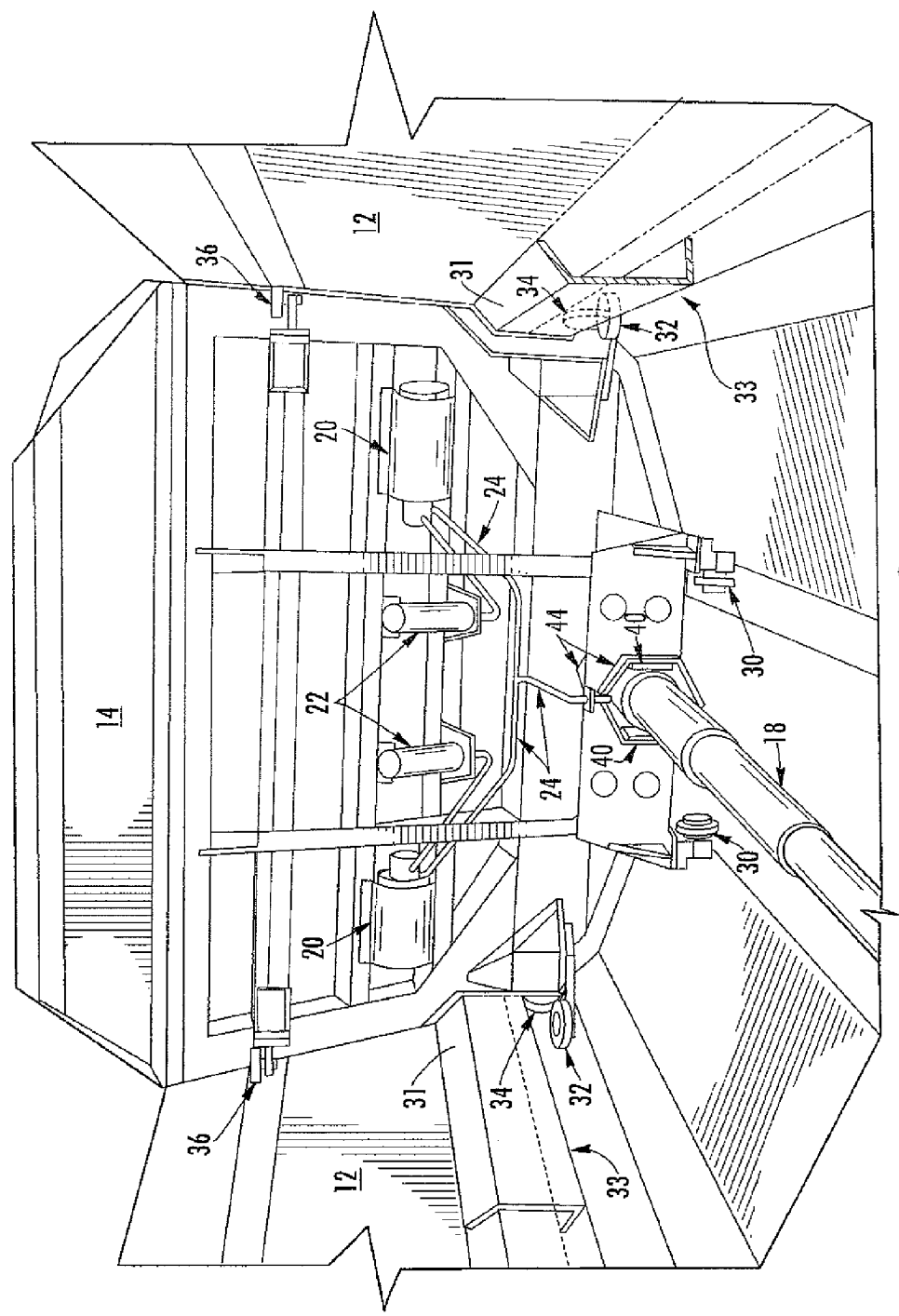
FIG. 2 is a perspective view of the ejector blade inside the receptacle body of an ejector truck wherein the blade is in its extended position.

The present invention relates to an improved movable ejector 14 for an ejector truck 10. The movable ejector 14 will be referred to herein as the ejector blade 14, however, it should be noted that the movable ejector 14 may be any suitable shape. One aspect of the invention relates to a device and method for combining a fluidly driven vibrator 20 with an ejector blade 14. FIGS. 1 and 2 show different views of the ejector blade 14 in its extended position within the receptacle body 12 of the ejector truck 10. FIG. 2 shows two vibrators 20 combined with the backside of the ejector blade 14, however, any suitable number may be used. The vibrator 20 may be any suitable vibrator 20 including a rotational vibrator or hammer vibrator. In one embodiment, the vibrator 20 is comprised of eccentrically mounted weights located between two bearings. The weights are rotated by a fluid motor. When actuated by the flow of fluid through the vibrator 20, the vibrator 20 vibrates thereby loosening material that may have become adhered to the ejector blade 14.

As seen in FIG. 2, the ejector truck 10 comprises a fluidly driven ejector actuator 18 for extending and retracting the ejector blade 14. In one embodiment, the ejector actuator 18 is a hydraulic cylinder. The ejector actuator 18 comprises a first end combined with a non-movable anchor member such as a portion of the truck or receptacle body 12 and a second end operatively combined with the blade 14. As seen in FIG. 2, the ejector actuator 18 may comprise spherical bearings at each end to avoid any bending or side loads as might be experienced with excessive ejector blade 14 twisting.

Figure 3:
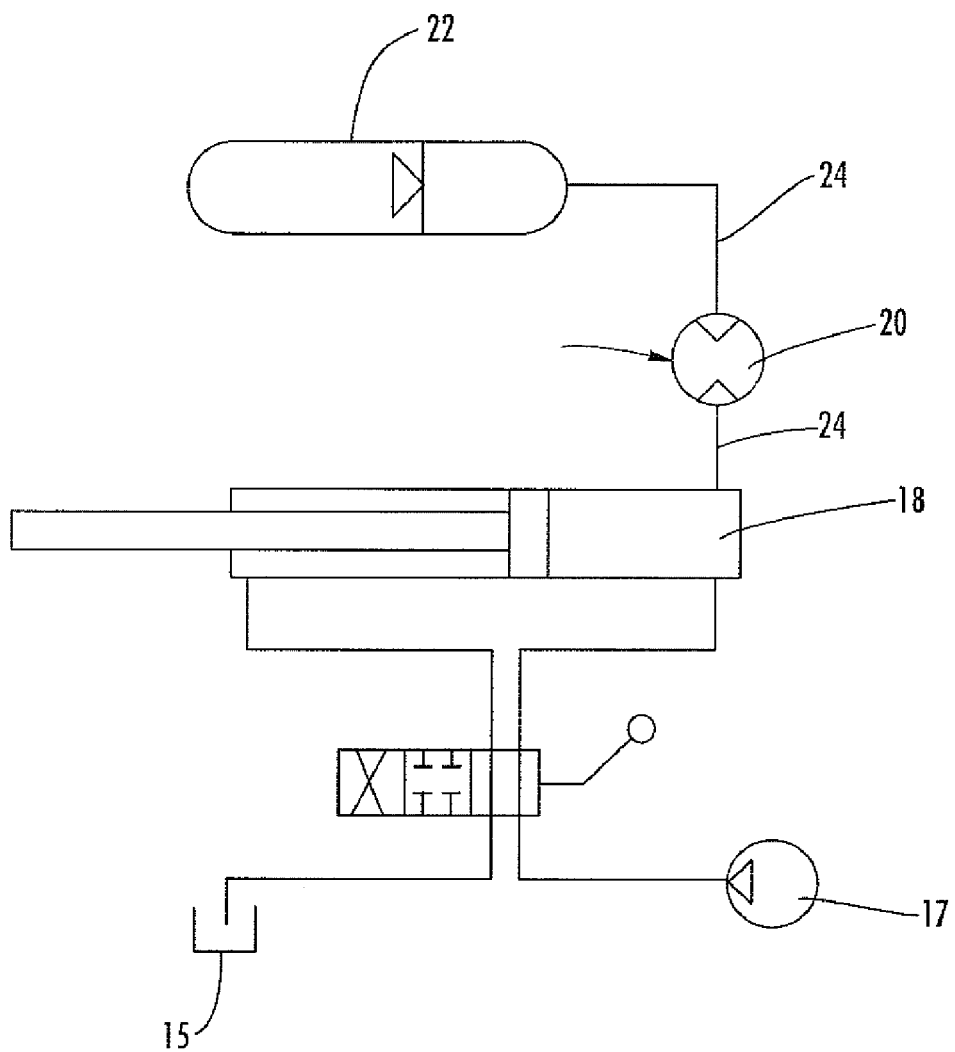
FIG. 3 is a schematic view of the fluid circuit.

FIG. 3 shows a schematic diagram of the fluid circuit used in one embodiment of the invention. As shown, the fluid circuit comprises a tank 15 and a pump 17. The fluid is preferably hydraulic fluid; however, any other suitable fluid may be used, including air. In the embodiment shown in FIGS. 2 and 3, fluid that has been pumped into the extend side of the ejector actuator 18 is directed through hoses 24 to the vibrator 20 to actuate the vibrator 20. After passing through and actuating the vibrator 20, the fluid is directed into a fluid accumulator 22. The preferred accumulator 22 is partially filled with a gas such as nitrogen so that it has a volume that allows fluid to accumulate therein until the pressure inside the accumulator 22 reaches a predetermined maximum amount. When the pressure reaches the predetermined maximum amount, it no longer accepts additional fluid. The accumulator 22 stores energy in the form of pressurized fluid until the pressure in the hose 24 that connects the accumulator 22 to the vibrator 20 is less than the pressure inside the accumulator 22. In one embodiment, the volume of the accumulator 22 is such that the fluid is allowed to pass through the vibrator 20 into the accumulator 22 until the ejector actuator 18 is fully extended.

When the ejector blade 14 is retracted and fluid from the extend side of the ejector actuator 18 is returned to tank 15, the pressure that built up within the accumulator 22 forces the fluid to flow in the reverse direction thereby actuating the vibrator 20 as the fluid passes through it and moves back into the ejector actuator 18. The fluid moves in the reverse direction until the fluid pressure within the accumulator 22 stabilizes to the preset level and volume.

Various alternate embodiments employ additional features that help to reduce the amount of material that may be stuck to the ejector blade 14. In one embodiment, the surface of the blade 14 that contacts the material may be coated with a high density plastic to try to prevent material from sticking to the ejector blade 14. In an alternate embodiment, vertically hanging chains may be used to knock adhered material off of the ejector blade 14. A plurality of chains may be attached at both of their ends closely parallel to each other so that they may contact the blade 14 severely when in motion but not with enough freedom to become entangled within each other. These chains are kept clear of the ejector blade 14 surfaces that can come in close proximity of the ejector body 12 sides and floor. The function of these chains is to break free of the ejector blade 14 at the end of its stroke due to their own inertia and pound against the ejector blade 14 to sufficiently free any material that is sticking to the chains and blade 14.

In another aspect of the invention, the ejector blade 14 comprises a plurality of low friction guides 30, 32, 34, 36 to help guide the blade 14 through the receptacle body 12 and minimize the friction between the blade 14 and the body 12 as the blade 14 moves through the body 12. It should be noted that these guides 30, 32, 34, 36 may be used along with or separate from the vibrator 20 embodiment described above and the heater embodiment described below. The low friction guides 30, 32, 34, 36 are seen best in FIGS. 2 and 4, where they are combined with the blade 14 inside the body 12. The placement of the guides 30, 32, 34, 36 inside the body 12 helps protect them from damage by the loading tool or, in the case of an articulated truck, helps protect them form damage in the event of body 12 rollover. The guides 30, 32, 34, 36 may be rollers, self lubricating guide blocks, or any other suitable guide. In the embodiment shown in FIG. 2, the guides 30, 32, 34, 36 are positioned on the blade 14 so that they correspond to the internal shape of the receptacle body 12. Some of the low friction guides 30, 32, 34, 36 are positioned on the blade 14 to minimize the blade's 14 tendency to twist laterally as the blade 14 moves through the body 12. Other low friction guides 30, 32, 34, 36 are positioned on the blade 14 to minimize the blade's 14 tendency to pivot about the blade's horizontal or vertical axis. It should be noted that although the invention is generally described herein as having the low friction guides 30, 32, 34, 36 combined with the blade 14 and move relative to the receptacle body 12, in an alternate embodiment the guides 30, 32, 34, 36 may be combined with the receptacle body 12 so that the blade 14 moves relative to the stationary guides 30, 32, 34, 36.

Figure 5:
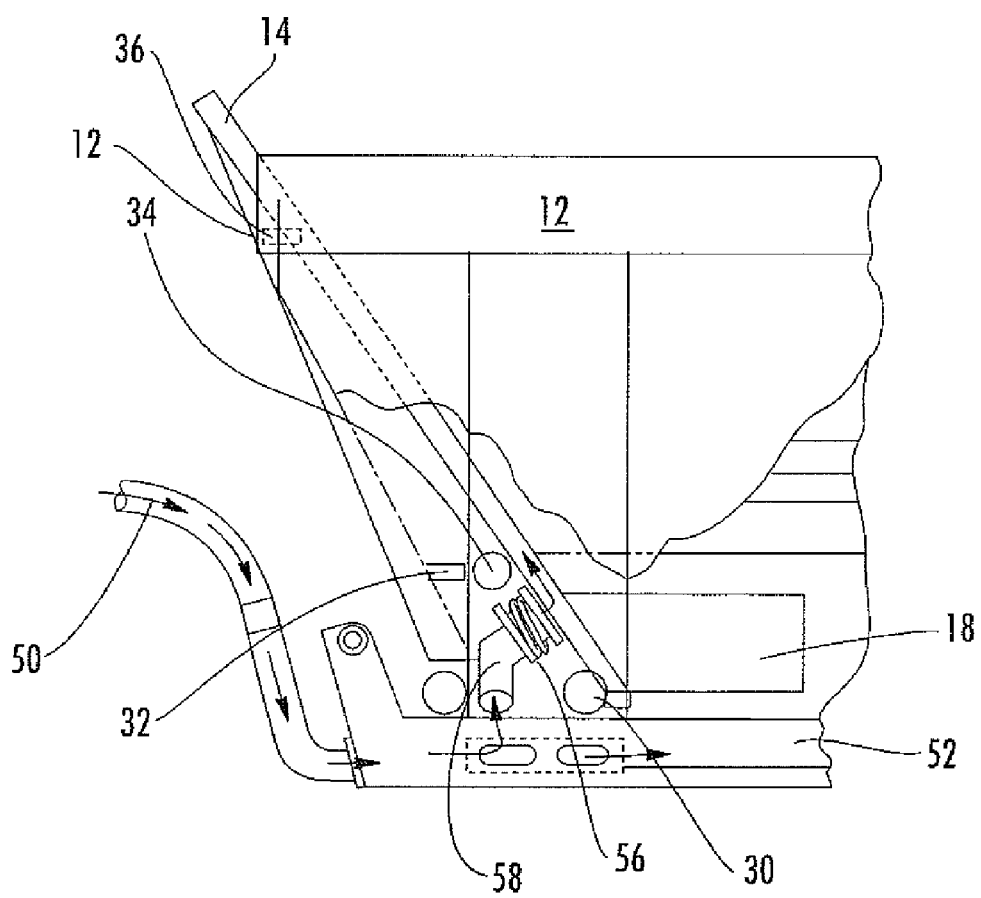
FIG. 5 is a side view of the receptacle body showing the ejector blade in phantom lines in its retracted position and the exhaust valve in its open position.

It should be noted, particularly with articulated trucks, that it can be difficult to locate the low friction guides 30, 32, 34, 36 in a confined space forward of the load to be ejected and still property control the ejector blade 14 so that it travels squarely within the body 12. Limiting the space required for the ejector blade 14 helps to avoid loss of body 12 capacity and to keep the center of gravity of the loaded body 12 as near to the front of the body 12 as required. As can be seen in FIG. 5, one aspect of this invention overcomes this problem by means of sloping the ejector blade 14 forward at an angle approximately between forty and seventy degrees with respect to the body 12 floor and by strategic placement of the low friction guides 30, 32, 34, 36 forward on the clean side of the blade 14 as the load is ejected.

Figure 4:
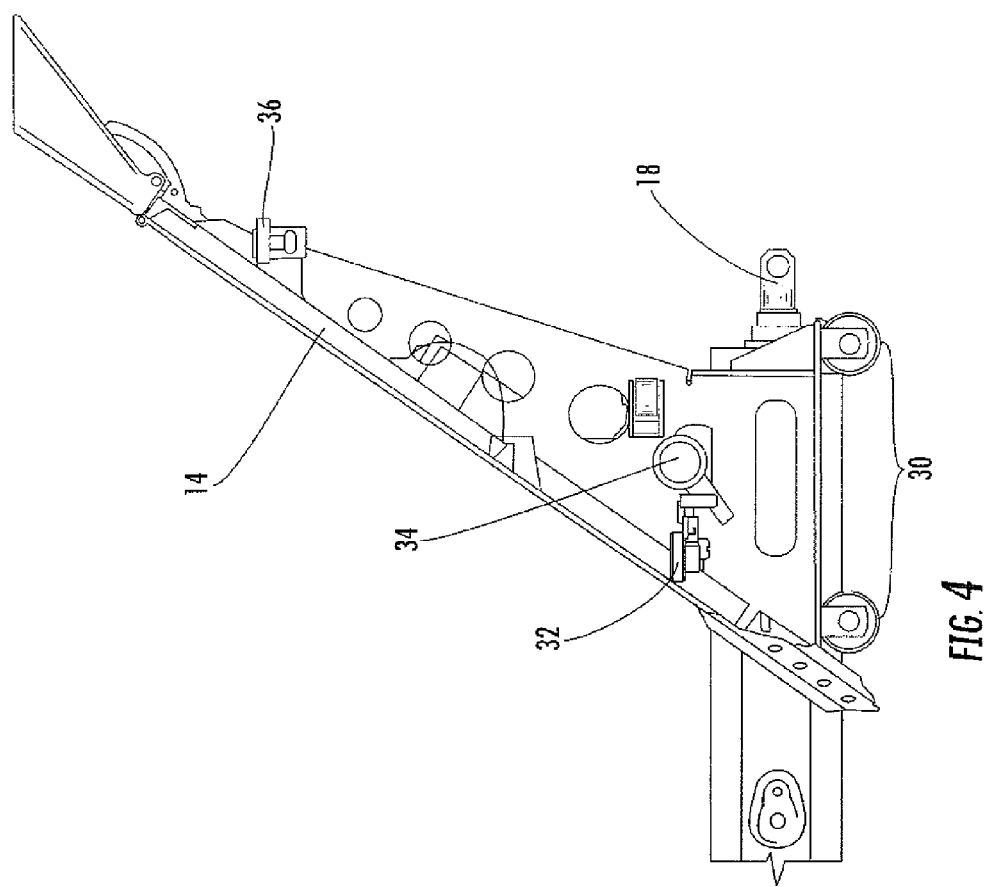
FIG. 4 is a side view of the ejector blade showing the placement of the low friction guides.

In one embodiment, there are several low friction guides 30, 32, 34, 36 that perform different functions. These several guides are best seen in FIGS. 2, 4, and 5. The lower 32 and upper 36 lateral low friction guides help to keep the blade 14 square with respect to the body 12 sides. These lateral low friction guides 32, 36 contact a generally vertical portion of the receptacle body's 12 side walls to help prevent the blade 14 from twisting laterally. In one embodiment, the lower 32 and upper 36 low friction guides are separated by a predetermined vertical distance to better resist the blade's 14 tendency to twist about its longitudinal axis. This can be seen in FIGS. 2, 4, and 5 wherein the upper lateral guides 36 are located near the top of the blade 14 and the lower lateral guides 32 are located near the bottom of the blade 14.

In one embodiment, the lower 32 and upper 36 low friction guides are separated a predetermined horizontal distance to better resist the blade's 14 tendency to twist about its vertical axis. This is best seen in FIGS. 4 and 5 wherein the blade 14 is positioned in the receptacle body 12 at an angle. In one embodiment, the blade 14 is angled at about a forty to seventy degree angle relative to the horizontal floor of the receptacle body 12. The blade 14 angle maximizes the lower 32 and upper 36 low friction guide's horizontal separation to resist the blade's 14 tendency to twist about its vertical axis and maximizes body 12 capacity.

The pitch low friction guides 34 are combined with the blade 14 so that they travel in a track 33 or otherwise contact a horizontal portion of the receptacle body 12. The pitch low friction guides 34 are spaced longitudinally between the floor low friction guides 30 to help to prevent the blade's 14 tendency to pitch (tilt) fore or aft about its longitudinal axis. The pitch low friction guides 34 are seen best in the embodiment shown in FIG. 2 wherein the track 33 comprises a cover portion 31 that helps to protect the guide 34 and track 33 from material that may otherwise gather in the track 33 and impede the guide's 34 ability to travel smoothly along the track 33. As shown in FIG. 2, the lower lateral guides 32 may also contact the body 12 under the cover portion 31 to help protect the guide 32 from material that may otherwise impede the guide's 32 ability to travel smoothly relative to the body 14.

The floor low friction guides 30 contact the floor portion of the receptacle body 12 to help reduce friction between the blade 14 and the floor portion of the receptacle body 12. In the embodiment shown in FIG. 4, there are four floor low friction guides 30, that support the weight of the ejector blade 14 and work in unison with the pitch low friction guides 34 to resist the tendency to pitch fore or aft, however any suitable number of floor low friction guides 30 may be used depending on the weight of the blade 14. As discussed above, the blade 14 is preferably angled at about a forty to seventy degree angle relative to the horizontal floor of the receptacle body 12. As seen in the embodiment of FIGS. 4 and 5, the front portion of the body 12 is also angled relative to the horizontal floor portion of the receptacle body 12, however, its angle is somewhat greater than that of the blade 14. The angle of the front portion of the receptacle body 12 helps to provide clearance between the body 12 and the prime mover 10 in the event of an accidental body rollover during an extreme turn. The angular difference between the front portion of the body 12 and the blade 14 minimizes loss of body 12 capacity while providing clearance inside the body 12 for the floor guides 30, as can be seen in FIG. 5.

Another means which aids in the resistance of vertical rotation of the blade 14 is the use of dampers 40, as shown in FIG. 2. The dampers 40 are preferably comprised of a rubber or urethane material and are used to protect the ejector actuator 18 in the event the blade 14 is twisted or rotated. For example, in the event that the lateral guides 36 and 32 become worn or are not adjusted for a close fit with the body 12, the blade 14 might twist excessively until a portion of the blade 14 structure (or a portion of the blade 14/ejector actuator 18 junction housing 44) contacts the ejector actuator 18. Under such circumstances, the contact between the blade 14 (or housing 44) and ejector actuator 18 would be severe and could damage the ejector actuator 18. The dampers 40 absorb some of this contact so as to help prevent damage to the ejector actuator 18. Additionally, the ejector actuator 18 comprises a thicker section at the probable point of contact with the dampers 40 as shown in FIG. 2 which helps to protect the ejector actuator 18.

Figure 6:
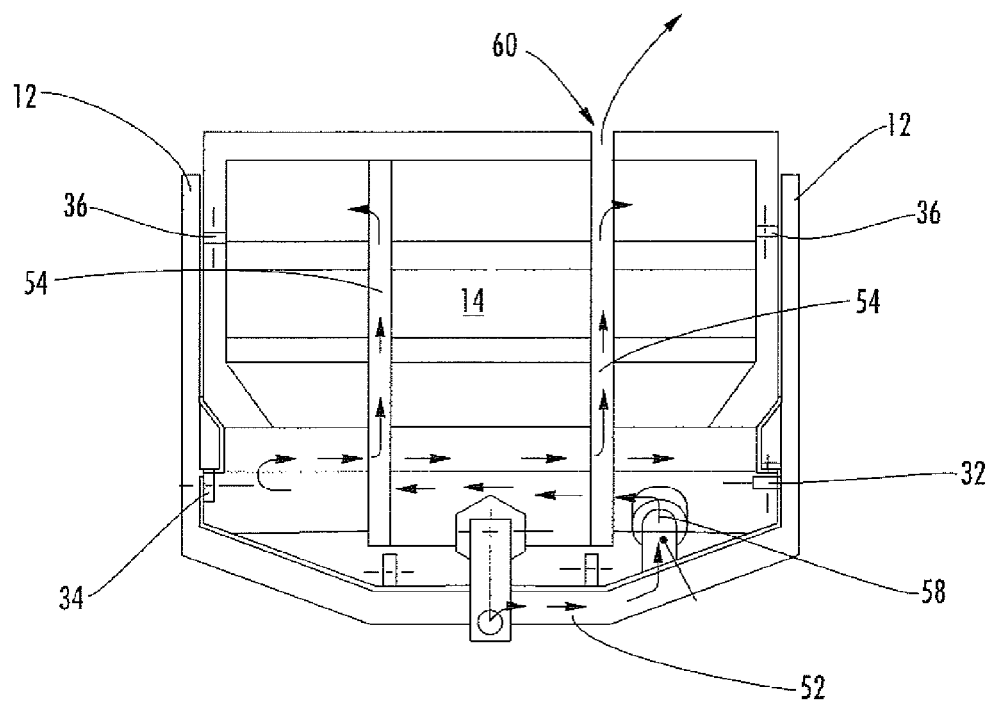
FIG. 6 is a front view of the ejector blade in the receptacle body showing the heat channels inside the blade and receptacle body.
Figure 7:
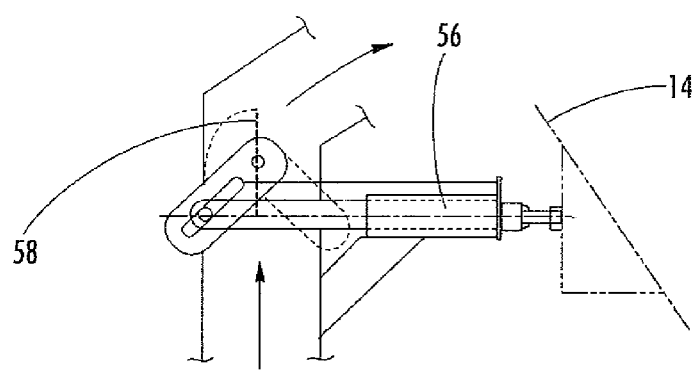
FIG. 7 is a side view showing the tension spring in its extended position so that the valve is in its open position to allow heated exhaust gases into the blade and/or receptacle body.

As seen in FIGS. 5, 6, and 7, one embodiment of the invention comprises a means to heat the blade 14 to help prevent frozen material from sticking to the blade 14. It should be noted that this heater means may be used along with or separate from the vibrator 20 embodiment and the guides 30, 32, 34, 36. This heat may come from any suitable source, such as an auxiliary heater. In the embodiment shown in FIG. 5, the heat source is the heated exhaust from the machine's 10 engine. As shown in FIG. 5, exhaust from the machine's 10 engine is directed into conduit 50 which directs the heated exhaust in and into channels 52, 54. Channels 52 direct the heated exhaust through the receptacle body 12 floor while channels 54 direct the heated exhaust through the blade 14. The heated exhaust in the channels 52, 54 radiates through the blade 14 and/or receptacle body 12 (as shown by the arrows in FIGS. 5, 6, and 7) thereby limiting the potential for ice and frozen material to build up in the receptacle body 12 or on the blade 14 and create a carry back situation. After moving through the channels 52, 54, the heated exhaust gases are expelled out into the ambient atmosphere through an exit opening 60 in the blade 14 or receptacle body 12.

FIGS. 5 and 7 show the valve 58 and spring 56 that may be used to control the flow of the exhaust gases. The valve 58 is located in or near conduit 50 or channel 52. The valve 58 has an open position and a closed position. FIGS. 5 and 7 show the valve 58 in its open position thereby allowing hot gasses to flow through it and into the blade 14. Valve 58 is open when the ejector blade 14 is in its retracted position. In its retracted position, blade 14 stretches spring 56 thereby opening valve 58. When the ejector blade 14 extends to eject the load, pressure is removed from spring 56 thereby causing valve 58 to close. In the valve's 58 closed position, the hot gasses are directed into the stationary portion of the body 12 to heat the body 12 or out an exhaust vent into the ambient atmosphere.

Having thus described the invention in connection with the preferred embodiments thereof, it will be evident to those skilled in the art that various revisions can be made to the preferred embodiments described herein with out departing from the spirit and scope of the invention. It is my intention, however, that all such revisions and modifications that are evident to those skilled in the art will be included with in the scope of the following claims.

What is claimed is as follows:

1. A system for ejecting material from a receptacle body of an ejector truck wherein the ejector truck comprises an engine having an exhaust, said system comprising:

a movable ejector extending substantially the width of the interior of the receptacle body, said movable ejector having a channel formed therein;

a fluid circuit having a pump to force fluid through said fluid circuit;

an ejector actuator having a first end and a second end wherein the first end is combined with an anchor member and the second end is operatively combined with the movable ejector, the ejector actuator is combined with and actuated by the fluid circuit, the ejector actuator has a retracted position wherein material can be loaded into the receptacle body and an extended position wherein material is ejected from the receptacle body by the movable ejector;

a conduit for directing the exhaust from the ejector truck's engine into the channel in the movable ejector to heat the movable ejector;

an exit opening in communication with the channel for dispelling the exhaust into the ambient atmosphere.

2. The system of claim 1 wherein the receptacle body comprises a floor having at least one channel formed therein; and the conduit directs exhaust from the truck's engine into the floor's channel to heat the floor of the receptacle body.

3. The system of claim 1 further comprising a valve for selectively allowing exhaust into the conduit, wherein the valve has an open position for allowing exhaust into the conduit and a closed position wherein exhaust in not allowed into the conduit.

4. The system of claim 3 wherein the valve is open when the movable ejector is in its retracted position and the valve is closed when the ejector blade is in its extended position.

* * * * *